(12) United States Patent  (10) Patent No.: US 9,151,219 B2
McConville et al.  (45) Date of Patent: Oct. 6, 2015

(54) METHODS AND SYSTEMS FOR SURGE CONTROL

(71) Applicant: Ford Global Technologies, LLC, Dearborn, MI (US)

(72) Inventors: Gregory Patrick McConville, Ann Arbor, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 13/965,963

(22) Filed: Aug. 13, 2013

(65) Prior Publication Data
US 2015/0047343 A1 Feb. 19, 2015

(51) Int. Cl.
| | |
|---|---|
| *F02D 23/00* | (2006.01) |
| *F02B 33/44* | (2006.01) |
| *F02B 47/08* | (2006.01) |
| *F02B 33/00* | (2006.01) |
| *F02B 37/16* | (2006.01) |
| *F02B 37/12* | (2006.01) |

(52) U.S. Cl.
CPC ............... *F02B 47/08* (2013.01); *F02B 33/00* (2013.01); *F02B 37/16* (2013.01); *F02B 2037/125* (2013.01)

(58) Field of Classification Search
CPC .......... F02B 33/00; F02B 37/16; F02B 47/08; F02B 2037/125
USPC ................. 60/598, 600, 605.1, 611
See application file for complete search history.

(56) References Cited

U.S. PATENT DOCUMENTS

| | | | |
|---|---|---|---|
| 3,614,259 | A | 10/1971 | Neff |
| 4,222,240 | A * | 9/1980 | Castellano ............ 60/611 |
| 4,351,154 | A | 9/1982 | Richter |
| 4,389,845 | A | 6/1983 | Koike |
| 4,443,153 | A | 4/1984 | Dibelius |
| 4,544,326 | A | 10/1985 | Nishiguchi et al. |
| 4,817,387 | A * | 4/1989 | Lashbrook ............ 60/611 |
| 4,949,276 | A | 8/1990 | Staroselsky et al. |
| 6,079,210 | A | 6/2000 | Pintauro et al. |
| 6,408,833 | B1 | 6/2002 | Faletti |
| 6,565,479 | B2 | 5/2003 | Fattic et al. |

(Continued)

FOREIGN PATENT DOCUMENTS

| | | |
|---|---|---|
| EP | 0435357 A1 | 7/1991 |
| EP | 2317111 A1 | 5/2001 |

(Continued)

OTHER PUBLICATIONS

Urley, Joseph Norman et al., "Method and System for Fuel Vapor Management," U.S. Appl. No. 13/660,884, filed Oct. 25, 2012, 38 pages.

(Continued)

*Primary Examiner* — Audrey K Bradley
(74) *Attorney, Agent, or Firm* — Julia Voutyras; Alleman Hall McCoy Russell & Tuttle LLP

(57) ABSTRACT

Methods and systems are provided for improving a margin to surge. A compressor recirculation valve is held at a semi-open position during steady-state boosted engine operation and operation in a soft surge region. The valve is fully opened to reduce hard surge, or fully closed to meet a transient increase in boost demand.

14 Claims, 7 Drawing Sheets

(56) References Cited

U.S. PATENT DOCUMENTS

| | | | |
|---|---|---|---|
| 6,681,171 | B2 | 1/2004 | Rimnac et al. |
| 6,725,847 | B2 | 4/2004 | Brunemann et al. |
| 6,810,667 | B2 * | 11/2004 | Jung et al. .................. 60/611 |
| 6,983,596 | B2 | 1/2006 | Frankenstein et al. |
| 7,137,253 | B2 | 11/2006 | Furman et al. |
| 7,163,005 | B2 | 1/2007 | Tussing et al. |
| 7,578,128 | B2 * | 8/2009 | Miyauchi et al. ............ 60/611 |
| 7,640,744 | B2 | 1/2010 | Rollinger et al. |
| 8,161,746 | B2 | 4/2012 | Ulrey et al. |
| 8,267,069 | B2 | 9/2012 | Hsia et al. |
| 8,286,616 | B2 | 10/2012 | Clarke et al. |
| 8,287,233 | B2 | 10/2012 | Chen |
| 8,333,071 | B2 | 12/2012 | Oakley et al. |
| 2006/0196182 | A1 | 9/2006 | Kimoto et al. |
| 2008/0163855 | A1 | 7/2008 | Matthews et al. |
| 2009/0071150 | A1 | 3/2009 | Joergl et al. |
| 2009/0077968 | A1 * | 3/2009 | Sun ......................... 60/605.2 |
| 2011/0023842 | A1 | 2/2011 | Kurtz |
| 2011/0094480 | A1 | 4/2011 | Suhocki et al. |
| 2012/0014812 | A1 | 1/2012 | Blaiklock et al. |
| 2012/0073287 | A1 * | 3/2012 | Kang et al. .................. 60/602 |
| 2012/0117964 | A1 * | 5/2012 | Chu et al. .................... 60/611 |
| 2012/0297765 | A1 | 11/2012 | Vigild et al. |
| 2013/0098340 | A1 * | 4/2013 | Zurke et al. ................. 123/564 |

FOREIGN PATENT DOCUMENTS

| | | |
|---|---|---|
| EP | 1124047 A1 | 8/2001 |
| EP | 2426340 A1 | 3/2012 |
| EP | 2562397 A1 | 8/2012 |

OTHER PUBLICATIONS

Ulrey, Joseph Norman et al., "Methods and Systems for Boost Control," U.S. Appl. No. 13/965,901, filed Aug. 13, 2013, 54 pages.

Banker, Adam Nathan et al., "Methods and Systems for Torque Control," U.S. Appl. No. 13/965,917, filed Aug. 13, 2013, 46 pages.

McConville, Gregory Patrick et al., "Methods and Systems for Boost Control," U.S. Appl. No. 13/965,938, filed Aug. 13, 2013, 40 pages.

Ulrey, Joseph Norman et al., "Methods and Systems for Boost Control," U.S. Appl. No. 13/965,952, filed Aug. 13, 2013, 40 pages.

Jankovic, Mrdjan J. et al., "Methods and Systems for Boost Control," U.S. Appl. No. 13/829,648, filed Mar. 14, 2013, 39 pages.

Styles, Daniel Joseph et al., "Methods and Systems for Boost Control," U.S. Appl. No. 13/965,698, filed Aug. 13, 2013, 43 pages.

Buckland Julia Helen et al., "Methods and Systems for Surge Control," U.S. Appl. No. 13/965,725, filed Aug. 13, 2013, 38 pages.

Ulrey, Joseph Norman et al., "Methods and Systems for Condensation Control," U.S. Appl. No. 13/965,751, filed Aug. 13, 2013, 36 pages.

Ulrey, Joseph Norman et al., "Methods and Systems for Condensation Control," U.S. Appl. No. 13/965,763, filed Aug. 13, 2013, 37 pages.

Ulrey, Joseph Norman et al., "Methods and Systems for EGR Control," U.S. Appl. No. 13/966,006, filed Aug. 13, 2013, 56 pages.

Ulrey, Joseph Norman et al., "Methods and Systems for EGR Control," U.S. Appl. No. 13/965,794, filed Aug. 13, 2013, 56 pages.

Byrd, Kevin Durand et al., "Multi-Staged Wastegate," U.S. Appl. No. 13/570,025, filed Aug. 8, 2012, 26 pages.

\* cited by examiner

METHODS AND SYSTEMS FOR SURGE CONTROL

FIELD

The present application relates to methods and systems for using compressor recirculation flow to improve surge control.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, potentially causing compressor surge. Surge can lead to NVH issues such as undesirable noise from the engine intake system. As such, based on the state of the airflow and induction pressure, the compressor may be in a soft surge or hard surge operating region. During hard surge, the compressor allows air to momentarily backflow through the compressor resulting in rapid pressure oscillations. During soft surge, there is relatively smaller instability of compressor operation.

To address either form of compressor surge, engine systems may include a compressor bypass valve coupled across the compressor to enable rapid decaying of boost pressure. One example of such a compressor bypass valve (also known as a compressor recirculation valve) is shown by Blaiklock et al. in US 2012/0014812. Therein, the compressor bypass valve is an open/closed type of valve that is maintained closed during steady-state engine operation and actuated open in response to any indication of surge. By opening the valve, a portion of air discharged from the compressor is recirculated to the compressor inlet. Still other approaches may involve the use of a fully variable valve to address surge.

However the inventors herein have identified potential issues with such systems. As one example, the valve of Blaiklock is kept closed when there is no indication of surge to reduce energy wastage and fuel consumption. In particular, if the valve is kept open (for example to alleviate surge tendencies before surge actually occurs), the compressor may not be able to provide the boost pressure required to meet the demanded engine torque. Fuel economy is also degraded due to extra compressor work needing to be compensated by increased turbine work. Also, energy may be required to hold the valve in the open position. The inventors have realized that such an approach may actually lead to more energy being wasted. This is because the margin to the surge limit may be smaller during steady-state conditions when the valve is kept closed, causing frequent surge, and requiring the valve to be frequently opened. As such, this consumes energy. In addition, if surge is caused due to an operator tip-out event, which is soon followed by an operator tip-in event, energy is needed again to actuate the valve closed and increase boost pressure. This can degrade torque responsiveness. In particular, if surge is avoided by opening the valve in response to a tip-out event which is soon followed by a tip-in event, it will take more time to recover boost pressure and provide engine torque than if the valve was not opened completely.

Further still, the valve of Blaiklock may not be able to address hard surge and soft surge equally well. For example, the opening of the compressor bypass valve and the resulting rapid increase in compressor flow may be better at addressing hard surge, which occurs during transient conditions such as tip-out, but not soft surge which can occur during steady state conditions. In particular, the large induction pressure reduction associated with the valve opening may decrease engine performance during the soft surge conditions if the valve is commanded open.

In view of these issues, the inventors herein have recognized that it may be advantageous to maintain the valve partially open and recirculate at least some compressor flow during steady-state conditions, before an indication of surge is received, even if a small amount of energy is consumed in doing so. In one example, the above issues are addressed by a method for a boosted engine having a compressor recirculation valve that can be shifted between a plurality of positions including at least a fully open position, a fully closed position, and a semi-open position. In one embodiment, the method comprises, operating an engine, without surge, with a valve coupling a compressor outlet to a compressor inlet at a semi-open position; in response to an indication of less severe surge or no surge, maintaining the valve at the semi-open position and in response to an indication of more severe surge, shifting the valve from the semi-open position to a fully-open position. In this way, both hard and soft surge can be addressed with reduced energy usage and while improving torque responsiveness.

For example, a boosted engine system may include a compressor recirculation valve positioned in a passage coupling the compressor outlet to the compressor inlet. The valve may have a default semi-open position during steady-state boosted operating conditions. The valve may be passively maintained in the semi-open position, without actuating an external actuator coupled to the valve, by a pair of opposing springs that are pre-loaded and pre-compressed. The pre-loaded springs hold the valve in the default semi-open position and enable a nominal flow rate to be provided across the compressor. As such, this increases the margin to a hard and soft surge limit, reducing the propensity for surge, and thereby reducing the need for valve actuation. By reducing the need for valve actuation while improving the surge margin during the steady-state conditions, energy usage is reduced. The valve may be maintained in the default semi-open position to reduce the occurrence of soft surge. In response to an indication of hard surge (such as during a tip-out), the external actuator may be energized in the opening direction to move the valve from the semi-open position to a fully-open position. By opening the valve to a larger degree, a rapid increase in compressor flow rate is provided to address the hard surge substantially immediately. In comparison, in response to a sudden increase in torque demand (such as during a tip-in), the external actuator may be energized in the closing direction to move the valve from the semi-open position to a fully-closed position. Herein, while engine power is being rapidly increased, the valve is closed to enable a rapid increase in boost pressure.

In this way, by using a compressor recirculation valve that is partially open during steady-state conditions, a margin to surge is improved and surge occurrence is reduced. Further, when surge (e.g., hard surge) does occur, the valve can be rapidly transitioned to a fully open position, thereby improving a hard surge response time. Likewise, the valve can be rapidly transitioned to a fully closed position to increase boost pressure, improving transient torque response and driveability. The incorporation of a semi-open mode substantially improves the margin to a hard and soft surge limit over conventional open/closed compressor surge valves, which have position limitations, without expending additional energy. This allows the three-state valve to better address both hard surge and soft surge. In addition, compared to fully variable valves, the three-state valve offers lower cost and complexity benefits. Further, the valve consumes substantially lower amounts of energy under most engine operating conditions. For example, the pressure balanced valve configured as an electronic throttle body may be fully variable but may use very little energy in any steady-state condition. Overall, surge can be addressed with a simpler valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
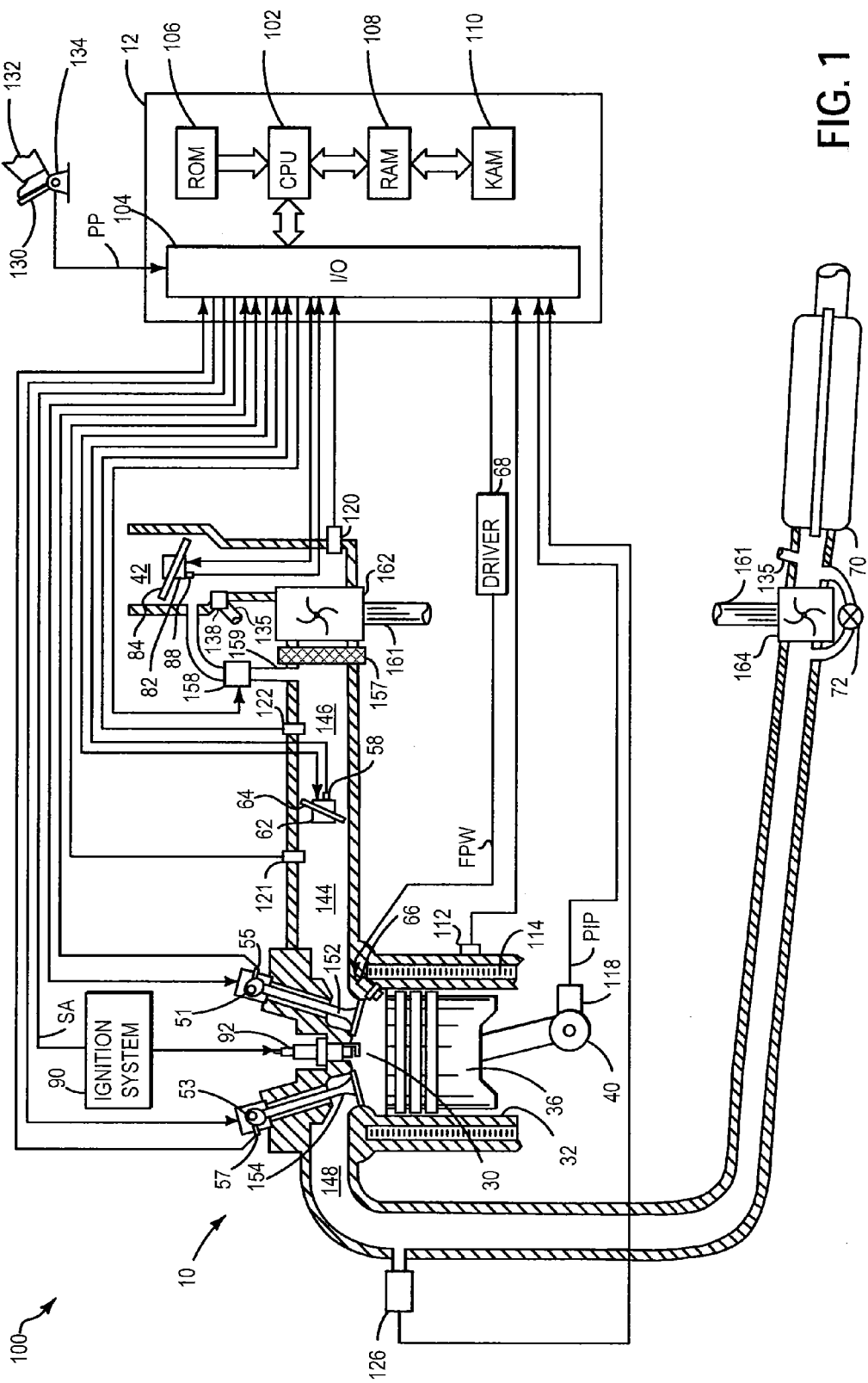
FIG. 1 shows an example engine air path of a boosted engine system including a compressor recirculation valve.
Figure 2:
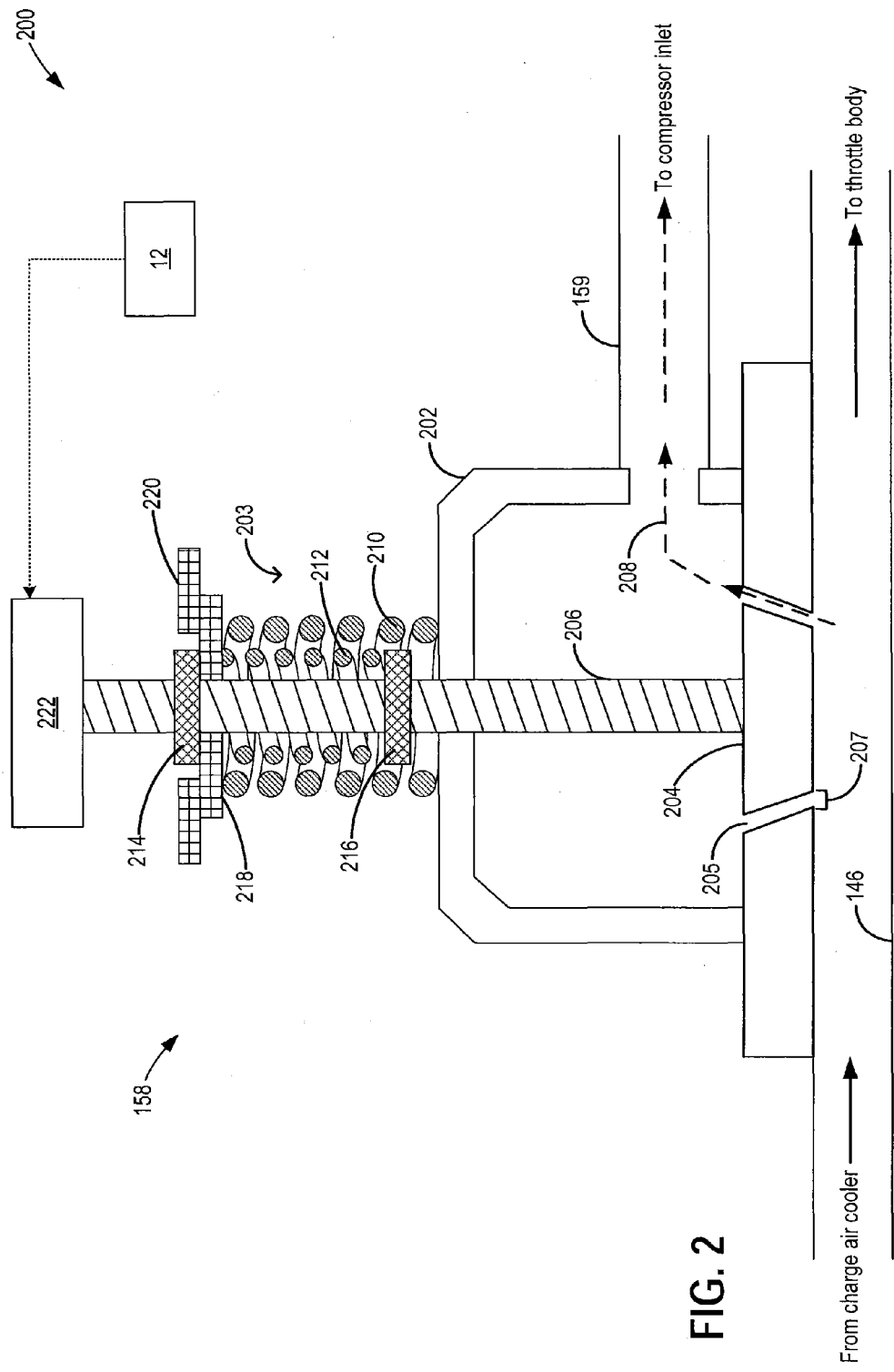
FIGS. 2-3 show detailed embodiments of the compressor recirculation valve of FIG. 1.
Figure 3:
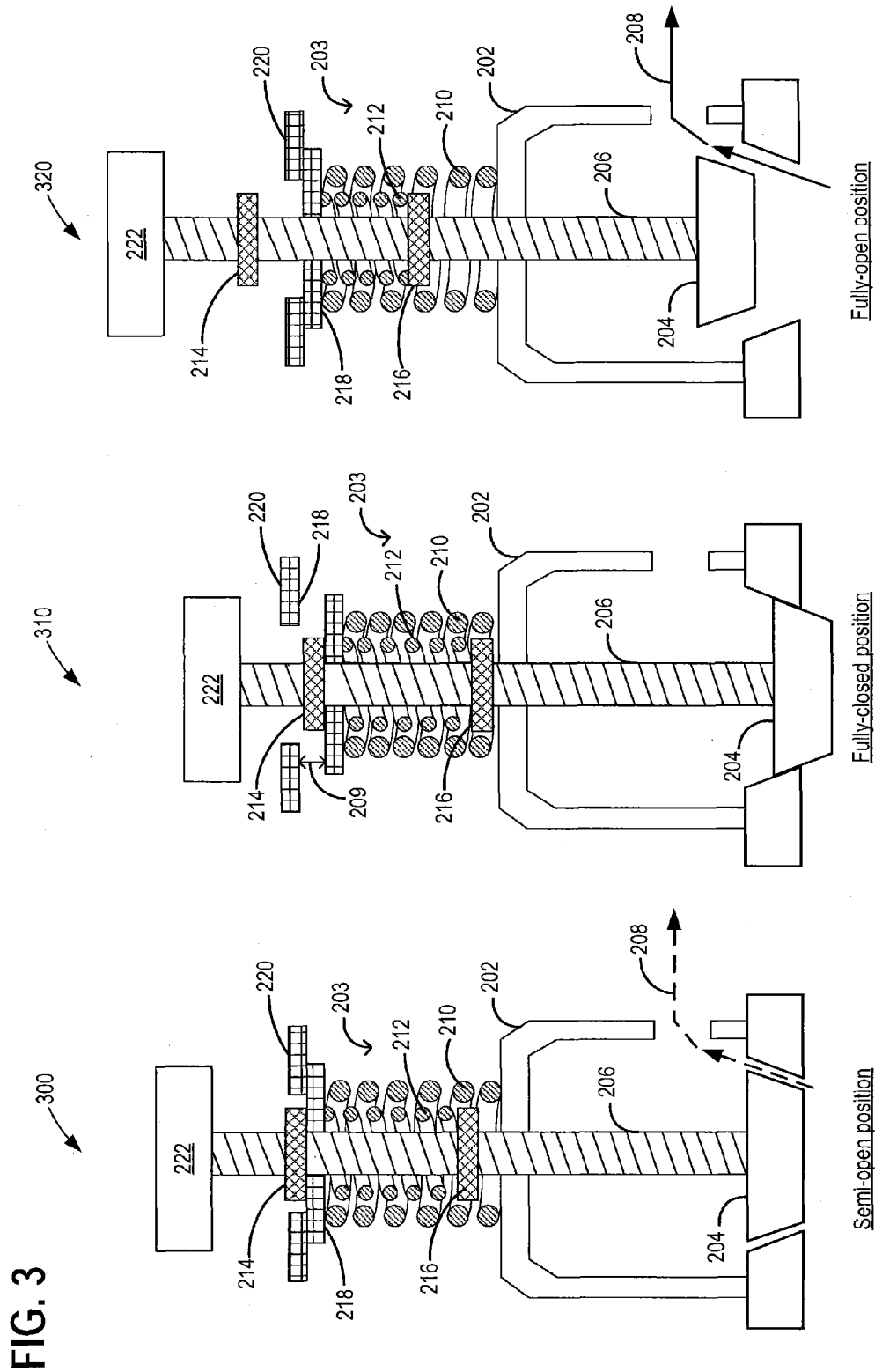

The following description relates to systems and methods for addressing compressor surge in a boosted engine system, such as the system of FIG. 1 using a three-state compressor recirculation valve, such as the valve of FIGS. 2-3. A controller may be configured to perform a control routine, such as the routine of FIG. 5, to adjust the position of the valve based on engine operating conditions. The controller may hold the valve in a default semi-open position during steady-state engine operating conditions, as well as in response to soft surge. In response to hard surge, the valve may be shifted to a fully-open position. In comparison, during a transient increase in torque demand, the valve may be shifted to a fully-closed position. The controller may refer to a compressor map, such as the map of FIG. 4, to identify hard and soft surge conditions. Example valve adjustments are described with reference to FIG. 6. In this way, surge is better addressed and boosted engine performance is improved.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 described one such cylinder or combustion chamber in detail. The various components of engine 10 may be controlled by electronic engine controller 12. Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In addition, intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the boost chamber 146.

In some embodiments, engine 10 is configured to provide exhaust gas recirculation, or EGR. When included, EGR is provided via EGR passage 135 and EGR valve 138 to the engine air intake system at a position downstream of air intake system (AIS) throttle 82 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Compressor 162 draws air from air intake passage 42 to supply boost chamber 146. In some examples, air intake passage 42 may include an air box (not shown) with a filter. Exhaust gases spin turbine 164 which is coupled to compressor 162 via shaft 161. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in passage 146, downstream of compressor 162, for cooling the boosted aircharge delivered to the engine intake. In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. As elaborated with reference to FIGS. 2-3, CRV 158 may be configured as a three-state valve having a default semi-open position from which it can be moved to a fully-open position or a fully-closed position. The semi-open position may be maintained during steady-state boosted engine operating conditions, as well as when operating in a soft surge region. By keeping the valve partially open during such conditions, at least some compressed air may be recirculated from the compressor outlet, upstream or downstream of the charge air cooler, to the compressor inlet and some boost pressure may be alleviated, improving the margin to surge.

The valve may include a pair of opposing springs that passively hold the valve in the semi-open position via spring compressive forces. Each spring may be pre-loaded and pre-compressed differently to provide a selected effective spring rate. For example, the pair of opposing springs may include an inner spring having a higher pre-loading and a lower effective spring rate and an outer spring having a lower pre-loading and a higher effective spring rate. The springs may be arranged such that when each spring is partially compressed via the pre-loading, the compression force from the springs holds the valve in the semi-open position. An external actuator, such as an electrically-actuated solenoid, or a pneumatically-actuated diaphragm or piston may be actuated by the controller to adjust the loading and compression of each spring to thereby move the valve to the fully-open or fully-closed position. In other words, the valve is passively held in the semi-open position by the springs, without actuation of the external actuator, and then actively moved to the fully-open or fully-closed positions by actuating the external actuator.

It will be appreciated that while the discussed embodiment of the CRV includes a pair of opposing springs with an inner spring having a higher pre-loading and a lower effective spring rate and an outer spring having a lower pre-loading and a higher effective spring rate, in alternate embodiments, the spring rates and preloads of the inner spring and outer spring may be designed to maintain the partially-open valve position in the presence of gas pressure while minimizing the actuator force required to hold the valve in the fully-open or fully-closed position.

The valve may be fully opened in response to a hard surge condition to rapidly reduce boost pressure and improve compressor flow. For example, when an operator tips-out of an accelerator pedal throttle 62 closes to reduce airflow. This leads to reduced forward flow through the compressor, which may cause compressor surge, degrading turbocharger performance. By fully opening CRV 158 in response to hard surge, the compressor operating condition is moved away from a surge limit or surge region. Specifically, the pressure differential across the compressor may be reduced and the flow rate through the compressor is increased. The valve may be fully closed in response to a transient increase in torque demand to rapidly increase boost pressure and improve transient torque response. In particular, by closing the CRV in response to a transient increase in torque demand, a larger proportion of boosted aircharge is delivered to the engine intake manifold, increasing engine torque and delivering more power to the turbine. This allows boost levels to be raised more quickly.

Figure 4:
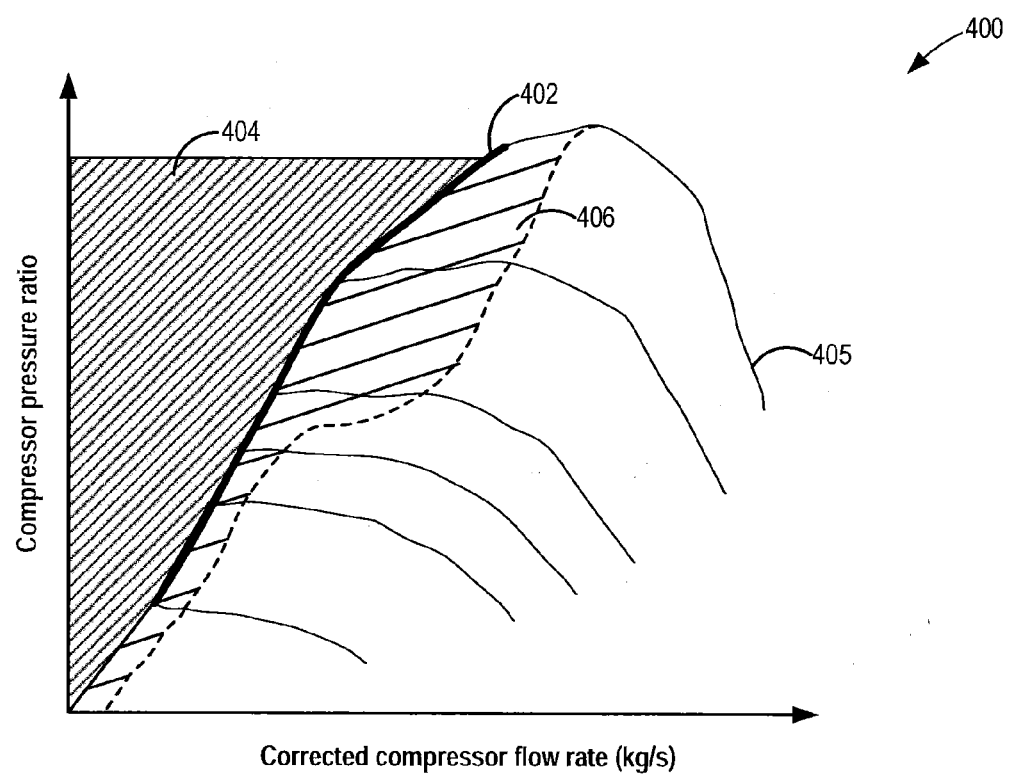
FIG. 4 shows a compressor map displaying hard and soft surge limits.

An engine controller may use a map, such as the map of FIG. 4, to identify whether the compressor is operating in or around a surge region. In particular, map 400 of FIG. 4 shows a change in compressor pressure ratio (along the y-axis) at different compressor flow rates (along the x-axis). The map includes contour lines 405 representing constant compressor speed. Line 402 shows a hard surge line (or hard surge limit) for the given operating conditions. Compressor operation to the left of hard surge line 402 results in operation in a hard surge region 404 (shaded region). As such, compressor operation in hard surge region 404 results in objectionable NVH and potential degradation of engine performance. Hard surge can occur during transient conditions when the engine airflow requirement suddenly decreases, such as during an operator pedal tip-out. This condition typically requires a rapid decrease in compressor outlet pressure or a rapid increase in recirculation flow through the compressor to offset the reduced flow to the engine. When in this region, the CRV may be shifted from the semi-open position to the fully-open position to move compressor operation away from the hard surge limit 402, specifically, to the right of surge limit 402.

Soft surge can occur in soft region 406 of the compressor map during an operator pedal tip-out, or steady-state conditions, where the engine requires maintaining boosted induction pressure. Herein, increasing flow through the compressor without dropping boosted pressure is desired. Thus, by maintaining the valve partially open, at least some increase in airflow through the compressor is enabled without reducing the boost pressure. In comparison, if an on/off compressor recirculation valve were used, the only action that could be taken with the valve would be to fully open, which would result in decreased boost pressure and lower engine torque. Since this is unlikely to be acceptable the engine would either have to operate in the soft surge region, or some other action could be taken to move away from soft surge such as changing the transmission gear.

Returning to FIG. 1, distributorless ignition system 90 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position (PP) adjusted by a foot 132 of a vehicle operator; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is described merely as an example, and that intake and exhaust valve opening and/or closing timings may vary, such as to provide positive or negative valve overlap, late intake valve closing, or various other examples.

Now turning to FIG. 2, an example embodiment 200 of the compressor recirculation valve (158) of FIG. 1 is shown. FIG. 3 shows an example embodiment 300 of the valve in the various states of displacement.

Embodiment 200 shows CRV 158 in the default semi-open state. Valve 158 may be coupled to boost intake chamber 146 such that in the semi-open state, a portion of cooled compressed air received from downstream of the charge air cooler can be recirculated into passage 159 for delivery to the compressor inlet.

Valve 158 may include a valve stem 206, a valve head 204, and a valve body 202. Valve head 204 may be displaced, for example raised or lowered, via valve stem 206, into valve opening 205 to vary an amount of airflow 208 through the valve. A pair of stepped ridges, including an upper ridge 214 and a lower ridge 216 may be coupled to valve stem 206. A moveable retaining washer 218 may also be coupled to valve stem 206. In the default position, moveable retaining washer 218 may be held immediately below upper ridge 214. An immoveable retaining washer 220 may be arranged in line with upper ridge 214 in the default position. By raising or lowering valve head 204 within valve opening 205, movable retaining washer 218 may be displaced relative to an immovable retaining washer 220 (specifically, when transitioning between the default mid position and the closed position. As such, if the valve is open more than the default position, the movable retaining washer does not move).

The valve may further include a spring system 203 having a pair of opposing springs. The pair of springs is configured to hold the valve in the semi-open position via the action of spring compression forces. The pair of opposing springs may include an inner spring 212 and an outer spring 210. The first, inner spring may have a first effective spring rate different from a second effective spring rate of the second, outer spring. In one example, the first, inner spring may have a substantially non-linear effective spring rate, and the second, outer spring may have a substantially linear effective spring rate. In another example, the second, outer spring may have a substantially non-linear effective spring rate, and the first, inner spring may have a substantially linear effective spring rate. Alternatively, each of the first and second springs may each have linear or non-linear effective spring rates. In one example, the spring rate of the first, inner spring may be lower than the spring rate of the second spring. In another example, the spring rate of the first, inner spring may be higher than the spring rate of the second spring. In addition, when compressed together, the springs may have an effective spring rate that varies with displacement of valve head 204 in opening 205. Note that the inner spring gets further compressed when the valve stem moves up from the default position while the outer spring is unaffected. Similarly, the outer spring is further compressed when the valve stem moves down from the default position while the inner spring is unaffected.

It should be noted that alternate spring arrangements that achieve a similar effect are possible, such as upper and lower springs instead of inner and outer springs. It is also possible to swap the function of the inner and outer spring so that they act in the opposite direction from the drawn embodiment. In each embodiment, the basis is that the springs act to force the valve in opposite directions, and that each spring is pre-compressed such that a significant external force is required to move the valve in one direction or the other.

Valve 158 may further include an external actuator 222 that is actuated based on signals received from controller 12. When actuated, external actuator 222 may pull on valve stem 206 to pull valve head 204 out of opening 205. This increases the size of gap 207 and thereby increases airflow through the valve. Alternatively, external actuator 222 may push valve head 204 further into opening 205 to decrease the size of gap 207 and thereby decrease airflow through the valve. In one example, external actuator 222 may be a push-pull solenoid that is electrically-actuated by controller 12. As elaborated with reference to FIG. 3, the solenoid may be energized to pull so as to move the valve to the fully-open position and energized to push to move the valve to the fully-closed position. In another example, external actuator 222 may be a diaphragm or piston that is pneumatically-actuated by controller 12. In the pneumatic embodiment, the diaphragm may be exposed to an adjustable air pressure (or vacuum) on one side and exposed to atmospheric pressure on the other side. By varying the air pressure applied on the diaphragm, the actuator may be pushed or pulled to thereby vary the position of valve head 204 in opening 205.

In the semi-open state, as shown at FIG. 2, both inner spring 212 and outer spring 210 are partially compressed. In particular, the springs may be pre-loaded. By holding the springs in this pre-compressed state, valve head 204 is held in a default position (e.g., co-linear, as depicted) relative to valve opening 205, such that a smaller gap 207 is formed through which an amount of compressor recirculation flow 208 may be delivered. In particular, the geometry of the valve stem 206, ridges 214 and 216, movable washer 218 and fixed washer 220 along with valve head 204 and valve opening 205 determine gap 207. In one example, the pre-loading of the springs may be adjusted to maintain a gap that provides a nominal flow rate. The nominal flow rate may vary with the pressure ratio across the valve, and may be adjusted based on the desired additional flow required to move to more favorable points on the compressor map during most engine operating conditions. For example, a larger gap may mean more airflow through the compressor which may be favorable to avoid soft surge. However, in most conditions, the increased gap and resulting increased airflow means more turbine power is required to do the work. The available turbine power may be limited based on engine operating condition, so once the wastegate is fully closed, insufficient turbine power will generally result in lower boost pressure. During such conditions, a nominal gap may be set to balance these requirements.

As such a compression state of the inner spring 212 is affected by valve stem adjustments that affect a distance between lower ridge 216 and moveable retaining washer 218 while a compression state of the outer spring 210 is affected by valve stem adjustments that affect a distance between moveable retaining washer 218 and immovable retaining washer 220.

In an alternate embodiment, the valve can be designed to passively open to relieve excess pressure in boost chamber 146. By setting the preloading of the springs, and the effective spring rates, the spring system of the valve is designed to passively open more in the presence of higher pressure on the bottom of the valve.

It will be appreciated that by setting or adjusting the pre-load and spring rate of inner spring 212, the degree of opening of the valve in the semi-open state (that is, the position of head 204 in opening 205, and consequently the size of gap 207) may be varied. For example, the valve may be designed to passively open more and enable the size of gap 207 in the semi-open state to be increased in the presence of higher pressure on the bottom of the valve.

As shown, when in the default semi-open position, moveable retaining washer 218 may be in direct contact with immovable retaining washer 220 such that there is no gap between the washers. As a result of this configuration, inner spring 212 is held pre-compressed between lower ridge 216 and moveable retaining washer 218, while outer spring 210 is held pre-compressed between moveable retaining washer 218 and valve body 202. This configuration is also shown at embodiment 300 of FIG. 3.

Embodiment 310 of FIG. 3 shows the valve in the fully-closed position. In this state, actuator 222 is energized to apply a downward force, or push, on the valve stem 206 and head 204. As a result of the downward force, upper ridge 214 is pushed downward, which impinges on moveable retaining washer 218 and pushes it downwards. As a result of the displacement of moveable retaining washer 218, a loading and compression of outer spring 210 is increased. In particular, a compression of outer spring 210 between valve body 202 and moveable retaining washer 218 is increased. At the same time, the compression of inner spring 212 is maintained due to no change in the displacement of moveable retaining washer 218 relative to lower ridge 216. The downward displacement of washer 218 increases a gap 209 between moveable retaining washer 218 and immoveable retaining washer 220, while applying a downward force that pushes valve head 204 further into opening 205. This reduces gap 207 and holds the valve closed against air pressure. In this state, there may no flow through the valve.

Embodiment 320 of FIG. 3 shows the valve in the fully-open position. In this state, actuator 222 is energized to apply an upward force, or pull, on valve stem 206 and head 204. As a result of the upward force, lower ridge 216 is pulled upward, towards moveable retaining washer 218. While moveable retaining washer 218 remains in the same position relative to immoveable retaining washer 218 as in the default position (at 300), the displacement of lower ridge 216 towards moveable retaining washer 218 causes a loading and compression of inner spring 212 to be increased. In particular, a compression of inner spring 212 between lower ridge 216 and moveable retaining washer 218 is increased. At the same time, the compression of outer spring 210 is maintained due to no change in the displacement of moveable retaining washer 218 relative to the valve body 202. The upward displacement of lower ridge 216 readjusts spring compression forces and causes a net upward force to be applied that pulls valve head 204 away from opening 205. This increases gap 207 and holds the valve open. In this state, flow 208 through the valve is increased.

In one example, the valve may be designed so that the default semi-open position provides a nominal flow rate that enables a boost pressure of up to 100 kPa, but not much beyond that. If the valve head has an area of 500 $mm^2$, the force on the valve at 100 kPa boost pressure would be 50N of force. To enable this, in one example, the inner spring may be pre-loaded with a load of 50N, and the spring rate set on the inner spring may be relatively low, such as 3 N/mm. If the external actuator needs to open the valve fully, for example, to provide a lift of 10 mm above the default position, the actuator would need to exert a force of 80N on the valve (that is equivalent to 50N preload+3 N/mm×10 mm). Additional force would be required (temporarily) to accelerate the valve opening (e.g., to fully open the valve substantially immediately).

The outer spring does not need to be very strong or stiff, since the main job of the outer spring is to hold the valve partly open in the default semi-open state when there are minimal forces trying to close the valve. Thus with reference to the above example, to enable the boost pressure of up to 100 kPa, the outer spring may be set with a pre-load of 20 N and a spring rate of 5 N/mm. If the valve head moves 2 mm from the default position to the closed position, the actuator would need to exert 30N of force on the spring to hold it closed. Additional actuator force would be used to hold the valve closed against pressure. To hold a boost pressure of 100 kPa, the actuator would need to exert 80N of force (that is equivalent to 50N for the pressure and 30N for the spring). As in the case of opening the valve against the other spring, additional force would be needed (temporarily) to accelerate the valve closing (e.g., to fully close the valve substantially immediately).

In this way, the pre-compressed state of the spring system enables the valve to be passively held partially open during nominal operating conditions. By enabling a nominal flow rate to be provided across the compressor, the margin to surge is improved. By then actively varying the valve position to a fully-open or fully-closed position, external actuation is used as required to open the valve (to reduce surge) or close the valve (to reduce transients and maximize boost pressure and flow to the engine). By providing an improved margin that reduces the need for frequent valve actuation, energy consumption is reduced.

Figure 8:
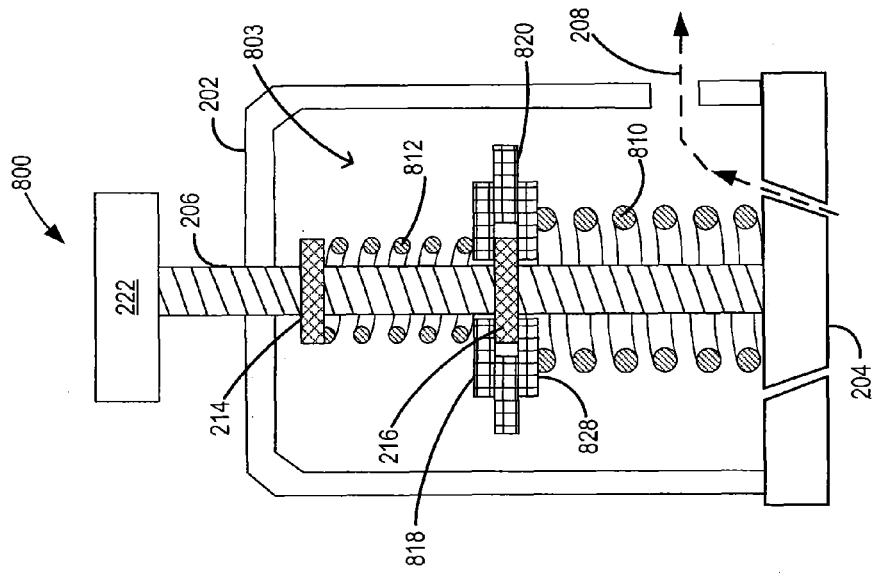
FIGS. 7-8 show alternate embodiments of the compressor recirculation valve of FIG. 1.
Figure 7:
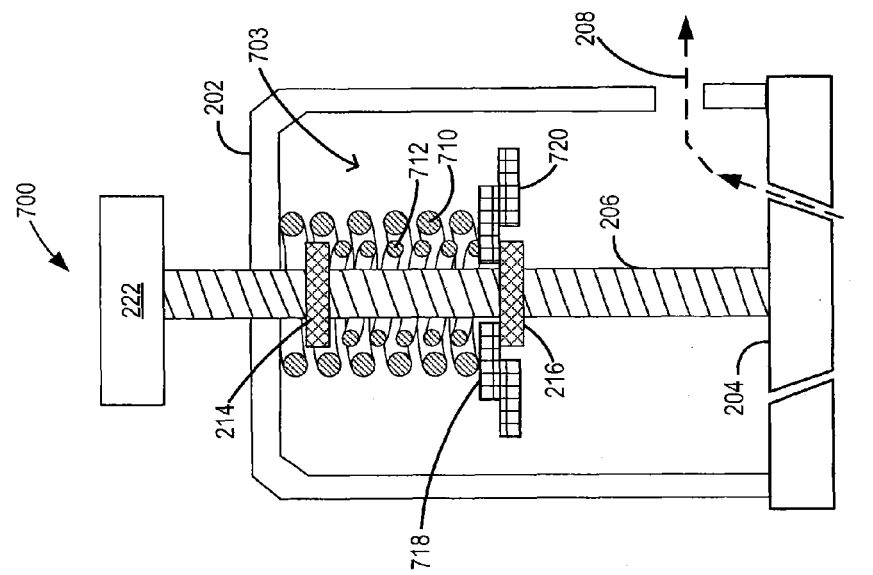

Still other embodiments of the compressor recirculation valve (valve 158 of FIG. 1) are shown with reference to FIGS. 7-8. Embodiment 700 of FIG. 7 and embodiment 800 of FIG. 8 each show the valve in the default semi-open state.

Embodiment 700 includes the same pre-compressed spring system of FIG. 2 with an inner pre-compressed spring and an outer pre-compressor spring. However, the alignment of the washers relative to the stepped ridges in the embodiment of FIG. 7 is inverted relative to the alignment in the embodiment of FIG. 2. In the embodiment of FIG. 7, a moveable retaining washer 718 is held immediately above lower ridge 216 while an immoveable retaining washer 720 is held in line with lower ridge 216 in the default position. Herein, when actuator 222 is energized to apply a downward force, or push, on the valve stem 206, the downward force causes upper ridge 214 to be pushed downward towards moveable retaining washer 718. As a result of the displacement of upper ridge 214 towards moveable retaining washer 718, a loading and compression of pre-compressed inner spring 712 is increased. In particular, a compression of inner spring 712 between upper ridge 214 and moveable retaining washer 718 is increased. At the same time, the compression of pre-compressed outer spring 710 is maintained due to no change in the displacement of moveable retaining washer 718 relative to the other end of the outer spring which is fixed to valve body 202. In comparison, when actuator 222 is energized to apply an upward force, or pull, on valve stem 206, the upward force pulls lower ridge 216 upward, pulling moveable retaining washer 718 with it towards valve body 202. When lower ridge 216 moves upwards, the displacement of moveable retaining washer 718 towards the valve body causes a loading and compression of outer spring 210 to be increased. In particular, a compression of outer spring 710 between moveable retaining washer 718 and valve body 202 is increased. At the same time, the compression of inner spring 712 is maintained.

Embodiment 800 of FIG. 8 includes upper and lower springs 812 and 810, respectively, which are held in a pre-compressed state in the default semi-open position. When actuator 222 is energized to apply a downward force, or push, on the valve stem 206, the downward force causes upper ridge 214 to be pushed downward towards moveable retaining washer 818. As a result of the displacement of upper ridge 214 towards moveable retaining washer 818, a loading and compression of pre-compressed upper spring 812 is increased. At the same time, the compression of pre-compressed lower spring 210 is maintained due to no change in the displacement of moveable retaining washer 828 relative to valve head 204. In comparison, when actuator 222 is energized to apply an upward force, or pull, on valve stem 206, the upward force pulls valve head 204 upward toward movable retaining washer 828, causing a loading and compression of lower spring 810 to be increased. At the same time, the compression of upper spring 812 is maintained because the distance between upper ridge 214 and movable washer 818 is maintained.

Figure 5:
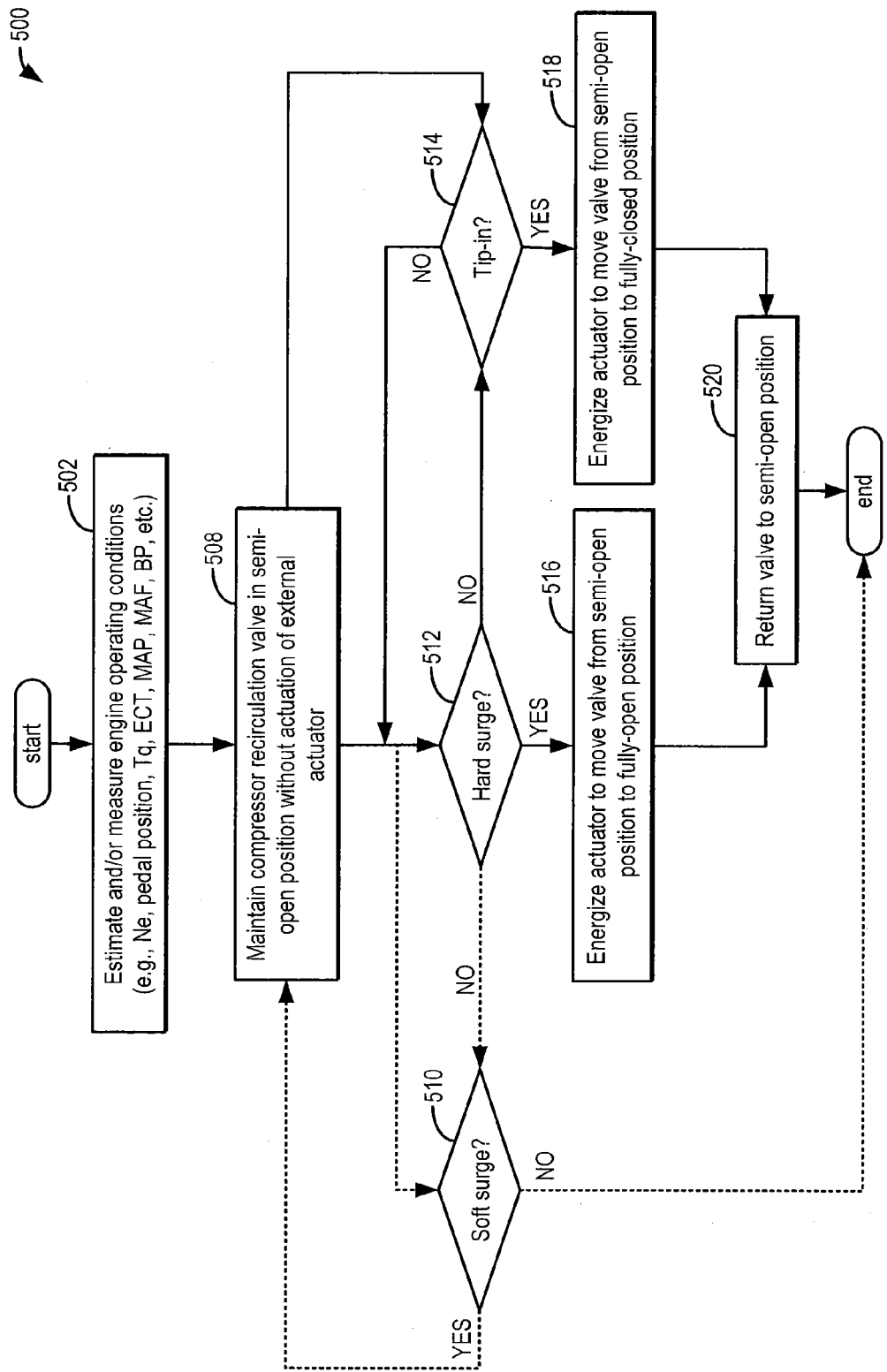
FIG. 5 shows a high level flow chart illustrating a routine that may be implemented for adjusting a position of the compressor recirculation valve of FIGS. 1-2 in response to an indication of surge.

Now turning to FIG. 5, an example routine 500 is shown for operating the compressor recirculation valve of FIGS. 1-3. A controller may energize an external actuator coupled to the valve to move the valve from the default semi-open position to either a fully-open position or a fully-closed position based on engine operating conditions to adjust boost pressure accordingly.

At 502, the routine includes estimating and/or measuring engine operating conditions. These include, for example, engine speed, operator pedal position, torque demand, engine temperature, intake manifold pressure, barometric pressure, etc.

At 508, during steady-state boosted operating conditions, a compressor recirculation valve coupled across the compressor (in a passage coupling from downstream of the compressor, upstream or downstream of the charge air cooler to the compressor inlet) may be held at a default semi-open position. Thus, when operating the engine boosted and without any surge, the valve coupling the compressor outlet to the compressor inlet is held at the semi-open position. As discussed with reference to FIGS. 2-3 and 7-8, the semi-open position may be a default position of the valve that enables a nominal flow rate to be provided. The nominal flow rate may be predefined, for example, based on the estimated engine operating conditions. The valve may be maintained in the semi-open position passively, via the geometry of the components in the valve, and via the compression forces from a pair of pre-loaded opposing springs of the valve, and without actuation of an external actuator of the valve.

From 508, the routine proceeds to each of 510, 512, and 514 to identify engine operating conditions that may trigger adjustments to the position of the valve.

Specifically, at 514, the routine determines if there is a transient increase in torque demand by the vehicle operator. In one example, a transient increase in torque may be demanded by the vehicle operator during an operator pedal tip-in. In response to the transient increase in torque demanded by the vehicle operator, at 518, the routine includes shifting the valve from the semi-open position to a fully-closed position. Shifting the valve from the semi-open position to the fully-closed position includes using external actuator actuation to energize the valve in a valve closing direction. As discussed above, the external actuator actuation may include electrically energizing a solenoid, or pneumatically energizing a diaphragm or piston. If a tip-in is not confirmed at 514, the routine proceeds to 512. The routine may then be re-performed at pre-selected intervals. In one example, the routine is performed continuously with the engine operating conditions being continuously assessed and the CRV position being continually adjusted in accordance.

To shift the valve from the semi-open position to the fully-closed position, the external actuator is actuated in a closing direction to increase compression of the second, outer spring while maintaining compression of the first, inner spring. The increased compression of the outer spring by the external actuator changes the compressive forces applied on the valve, and displaces the valve head in a closing direction. In particular, the actuator acts on the valve stem. The force of the actuator then overcomes the force of the spring to move the valve to the closed position.

If a tip-in is not confirmed at 514, the routine proceeds to 512 to determine if there is an indication of hard surge. Alternatively, the routine may proceed to 512 directly from 508. In one example, hard surge may be confirmed in response to an indication of more severe surge (e.g., indication of surge being above each of the first threshold and the second threshold). As another example, hard surge may be confirmed in response to boosted engine operation where a margin to surge limit (e.g., a surge line, such as surge line 402 of FIG. 4) is smaller than the threshold. This may include, for example, the engine operating with boost in hard surge region 404 of compressor map 400. As such, hard surge may occur during an operator pedal tip-out when the engine airflow requirement suddenly drops. In still other examples, the indication may be that hard surge is possible (potential hard surge condition) or anticipated.

In response to the indication of more severe surge, the routine proceeds to 516 to shift the valve from the semi-open position to a fully-open position. Shifting the valve from the semi-open position to the fully-open position includes using external actuator actuation to energize the valve in a valve opening direction. For example, where the external actuator is a solenoid, the external actuator actuation includes electrically energizing the solenoid. As another example, where the external actuator is a pneumatically-controlled device, such as a diaphragm or a piston exposed to a controllable air pressure on one side and atmospheric pressure on an opposite side, the external actuator actuation includes pneumatically energizing the diaphragm or piston.

In some embodiments, during a pedal tip out, the control system may automatically fully-open the valve in anticipation of the flow rate reduction to avoid surge, before receiving an actual indication of surge.

As previously discussed, the valve may include a first, inner spring and a second, outer spring, the first spring pre-compressed with a first load and the second spring pre-compressed with a second, different load such that the valve is maintained in the semi-open position via compressive forces of the pre-compressed springs, without external actuator actuation. To shift the valve from the semi-open position to the fully-open position, the external actuator is actuated in an opening direction to increase compression of the first, inner spring while maintaining compression of the second, outer spring. The increased compression of the inner spring by the external actuator changes the compressive forces applied on the valve, and displaces the valve head in an opening direction. In particular, the actuator acts on the valve stem. The force of the actuator then overcomes the force of the spring to move the valve to the open position.

From each of 516 and 518, the routine proceeds to 520 wherein the valve is subsequently returned to the default position. In one example, the valve may be held fully-open or fully-closed for a pre-defined duration and then returned to the default semi-open position. In an alternate example, controller iterates through 514 to 512 until the indication of surge has reduced, and/or the transient torque demand is met, at which time the valve is returned to the default position.

In a further example, if each of a tip-in and a hard surge is not confirmed, the routine proceeds to 510 where it may be determined if there is an indication of soft surge. In one example, soft surge may be confirmed in response to an indication of less severe surge (e.g., indication of surge being above a first threshold and below a second threshold, the second threshold higher than the first threshold). As another example, soft surge may be confirmed in response to boosted engine operation where a margin to surge limit (e.g., a surge line, such as surge line 402 of FIG. 4) is higher than a threshold. This may include, for example, the engine operating with boost in soft surge region 406 of compressor map 400. As such, soft surge may occur during an operator pedal tip-out, or steady-state boosted operating conditions, where the engine requires maintaining boosted induction pressure. In still other examples, the indication of soft surge may include an indication that soft surge is possible (potential soft surge condition) or anticipated.

In response to the indication of less severe surge, the routine returns to 508 to shift or maintain the valve at the semi-open position. Herein, by maintaining the valve partially open in response to less severe surge or soft surge, at least some recirculated airflow through the compressor is enabled, thereby increasing flow through the compressor without dropping boost pressure.

In this way, the state of the valve is maintained and not changed in response to soft surge. However, it will be appreciated that during alternate conditions, such as when the valve is fully closed (e.g., during a tip-in), in response to the indication of soft surge, the valve may be shifted from the fully closed position to the semi-open position. Likewise, during conditions when the valve is fully open (e.g., when addressing hard surge), in response to the indication of soft surge, the valve may be shifted from the fully open position to the semi-open position.

In one example, during steady-state boosted engine operating conditions, a controller may hold a valve coupled in a bypass across a compressor at a semi-open position. In response to a tip-in (e.g., an operator pedal tip-in), the controller may move the valve to a fully-closed position. In comparison, in response to a tip-out (e.g., operator pedal tip-out), the controller may move the valve to a fully-open position. The steady-state engine operating conditions may include conditions where there is no indication of surge or a potential for soft surge, while the tip-out may include an indication of hard surge.

Figure 6:
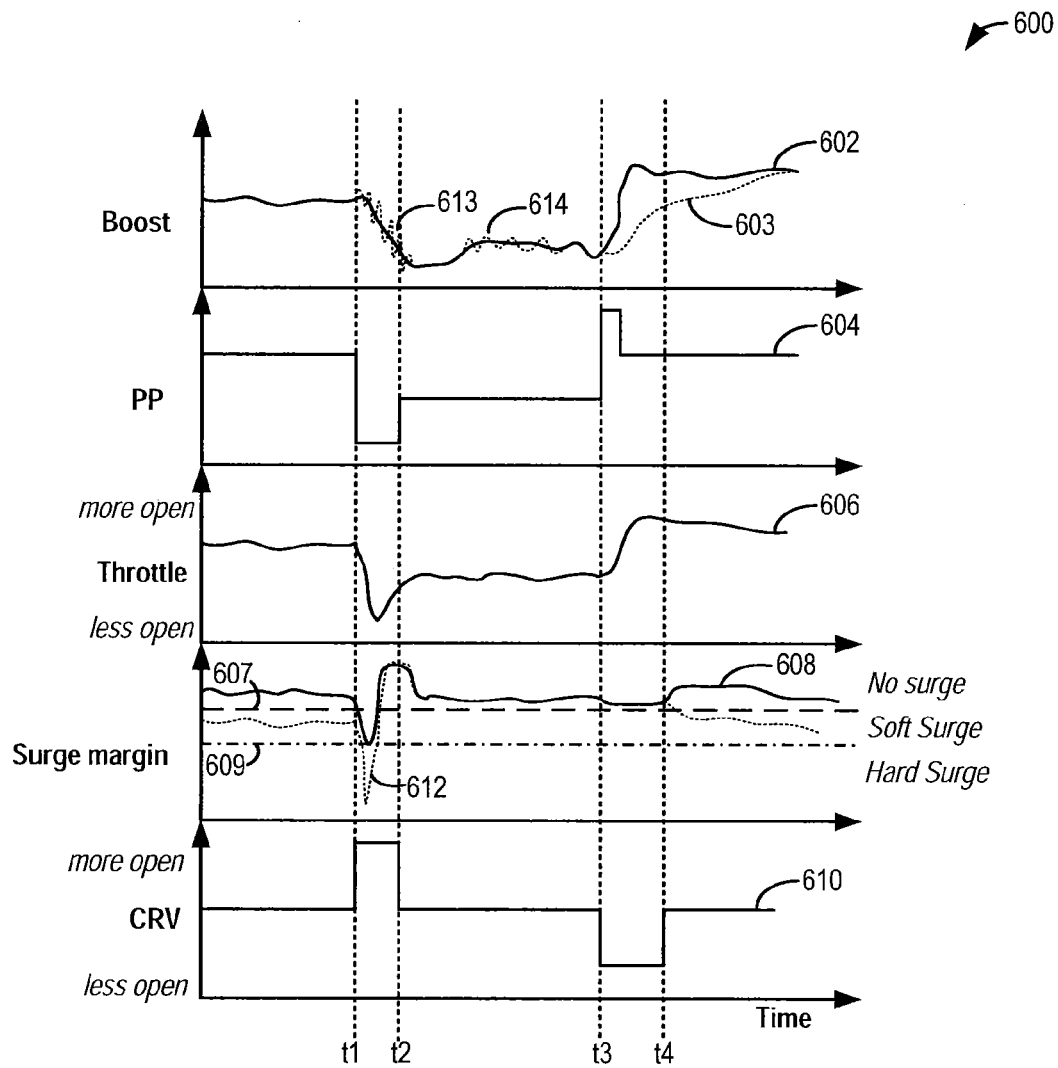
FIG. 6 shows example compressor recirculation valve adjustments during varying engine operating conditions, according to the present disclosure.

Now turning to FIG. 6, an example valve adjustment is shown at map 600. Map 600 depicts boost pressure at plot 602, operator pedal position (PP) at plot 604, air intake throttle opening at plot 606, a compressor surge margin relative to hard and soft surge limits at plot 608, and adjustments to the position of a compressor recirculation valve (CRV) at plot 610.

Prior to t1, the engine may be operating at steady-state boost operating conditions. Herein, a higher boost pressure (plot 602) may be provided to meet the torque demand, as inferred from the pedal position (plot 604). In addition, the throttle (plot 606) may be more open to provide the airflow required to meet the higher torque demand. During these conditions, the engine may be operated with the CRV at the default semi-open position (plot 610). By increasing flow through the compressor via the CRV, the surge margin (plot 608) may be maintained above surge lines 607 and 609, outside of each of a hard surge region and a soft surge region (in a region with no surge).

At t1, the operator may release the pedal leading to a tip-out event. In response to the tip-out, and the corresponding drop in airflow and torque demand, the throttle opening may be rapidly decreased. As a result, there may be a sudden decrease in compressor flow while the pressure ratio is relatively high, causing the surge margin to be reduced. In response to the tip-out, and in anticipation of potential hard surge, at t1, the CRV may be shifted to a fully-open position. By fully opening the valve, boost pressure may be rapidly dumped from downstream of the compressor, reducing the pressure differential across the valve, and improving compressor flow. The valve may then be maintained at the fully-open position at least until t2 when the compressor ratio moves out of the soft surge region, after which the valve may be returned to the default semi-open position. In alternate examples, the controller may open the valve for a predefined duration and then return the valve to the semi-open position once the predefined duration has elapsed.

As such, if the CRV were not held semi-open before t1 (e.g., if the CRV were held closed), at the time of the tip-out at t1, the surge margin may reduce substantially more, moving the compressor operation temporarily into a hard surge region, below limit 609. Then, in response to the indication of hard surge, when the CRV is opened, the surge margin may reduce and the compressor may be moved into the soft surge region. Plot 612 (dotted lines) depicts this change in compressor surge margin in the absence of recirculation flow. In addition, if the CRV were not actuated, during the tip-out, substantial boost pressure oscillations of larger amplitude may be experienced, as shown by segment 613 (dashed line) of plot 602.

Between t2 and t3, the engine may be operated with moderate boost based on the moderate torque demand from the operator. The throttle opening may also be increased to meet the torque demand. During the steady-state conditions, the surge margin may be high and the compressor may operate substantially in the no surge region. During these conditions, the valve is maintained in the partially open default state allowing some recirculation flow through the compressor, reducing the propensity for soft surge. If the valve were closed during that time, the surge margin would be reduced and the compressor could operate in the soft surge region as depicted by line 612, resulting in boost pressure fluctuations of smaller amplitude (as shown at segment (dashed line) of plot 602). Thus, between t2 and t3, the valve is maintained in the semi-open state.

At t3, the operator may depress the pedal leading to a tip-in event. In response to the tip-in, and the corresponding increase in airflow demand, boost pressure demand, and torque demand, the throttle opening may be rapidly increased. Also, to reduce torque transients and allow the boost pressure to be rapidly increased, at t3, the CRV may be shifted to a fully-closed position. By closing the valve while increasing an opening of the throttle, boost pressure downstream of the compressor can be rapidly increased, allowing boost pressure delivered to the engine to be increased to meet the torque demand. The valve may then be maintained at the fully-closed position at least until the demanded boost pressure is achieved, after which the valve may be returned to the default semi-open position. In alternate examples, the controller may close the valve for a predefined duration and then return the valve to the semi-open position once the predefined duration has elapsed. As such, by closing the CRV, the boost response time is improved. Specifically, if the recirculation valve remained in the default position, the desired boost pressure may be achieved slowly (see segment 603, dashed lines, of plot 602), and turbo lag may be experienced. In addition, by returning the valve to the semi-open position after the desired boost pressure has been achieved, the compressor operation may be maintained in the no surge region. In comparison, in the absence of compressor recirculation, the compressor operation may move into the soft surge region after the tip-in, as shown at plot 612 (dotted lines) after t4.

It will be appreciated that in alternate examples, the tip-out at t1 may be immediately followed by a tip-in. In such an event, the controller may shift the valve from the fully-open position to the fully-closed position directly.

In one example, a vehicle system comprises an engine, drive wheels coupling the vehicle to a road, a pedal for receiving an operator torque demand, and a compressor for providing a boosted aircharge to the engine. The system may further include a recirculation passage with a valve coupling an outlet of the compressor to an inlet of the compressor, the valve including a pair of opposing springs coupled to an external actuator. The valve may include a first, inner spring precompressed with a first load, and a second, outer spring precompressed with a second load, the valve coupled to an external actuator. A controller with computer-readable instructions may be configured to, during boosted engine operation, while a margin to a surge limit is higher than a threshold, operate the compressor with the valve maintained at a semi-open position without actuation of the external actuator. In response to the margin being smaller than the threshold, the controller may reduce boost pressure by energizing the external actuator to shift the valve to a fully-open position. Further, in response to a pedal tip-in, the controller may increase boost pressure by energizing the external actuator to shift the valve to a fully-closed position. The external actuator may be a push/pull type of electric solenoid, wherein energizing the external actuator includes electrically energizing the solenoid in a first direction to shift the valve to the fully-closed position and electrically energizing the solenoid in a second direction to shift the valve to the fully-open position. The external actuator may be electrically energized in the first direction to act on the valve stem such that the force of the actuator overcomes the force of the first spring and moves the valve to the closed position (in effect increasing the first load on the first spring while maintaining the second load on the second spring to shift the valve to the fully-closed position). Likewise, the external actuator may be electrically energized in the second direction to act on the valve stem such that the force of the actuator overcomes the force of the second spring and moves the valve to the open position (in effect increasing the second load on the second spring while maintaining the first load on the first spring to shift the valve to the fully-open position). Alternatively, the external actuator may be a diaphragm, wherein energizing the external actuator includes pneumatically energizing the diaphragm in a first direction to shift the valve to the fully-closed position and pneumatically energizing the solenoid in a second direction to shift the valve to the fully-open position.

In this way, a simple, cost-effective, and energy efficient valve is provided for addressing surge. By using a compressor recirculation valve having a default partially open configuration, the flow rate through the compressor is increased by recirculating a portion of the flow from downstream of the compressor to upstream of the compressor during steady-state conditions, improving a margin to hard surge limit. Furthermore, by holding the valve at the default position passively, without use of an external actuator, increased flow through the compressor at the same boost pressure is provided without consuming energy to hold the valve in the desired position. By recirculating at least some flow at the default valve position, the frequency of surge occurrence is reduced. By allowing a nominal amount of recirculation, the compressor can operate in the surge-free region rather than the soft surge region. By reducing the need for valve actuation, energy savings benefits may be achieved. In addition, by relying on one of three valve states, surge can be addressed with a valve having reduced cost and complexity compared to a fully variable recirculation valve.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A boosted engine method, comprising:
   if a compressor surge limit margin exceeds a threshold, boosting the engine and maintaining a valve coupling a compressor inlet to a compressor outlet at a semi-open, default position;
   if the margin is below the threshold, shifting the valve from the semi-open position to a fully-open position;
   responsive to a transient torque demand increase by a vehicle operator, shifting the valve from the semi-open position to a fully-closed position.

2. The method of claim 1, wherein the default, semi-open position of the valve is a position that provides a nominal flow rate across the compressor, the nominal flow rate based on a surge-mitigating compressor flow rate.

3. The method of claim 1, wherein the valve includes a first spring and a second spring, the valve coupled to an external actuator, the first spring pre-compressed with a first load and the second spring pre-compressed with a second load, the valve maintained in the semi-open position via compressive forces of the pre-compressed first and second springs, without external actuator actuation.

4. The method of claim 3, wherein shifting the valve from the semi-open position to the fully-open position includes using external actuator actuation to energize the valve in an opening direction to increase compression of the first spring while maintaining compression of the second spring, and wherein shifting the valve from the semi-open position to the fully-closed position includes using the external actuator actuation to energize the valve in a closing direction to increase compression of the second spring while maintaining compression of the first spring.

5. The method of claim 4, wherein the external actuator is a solenoid, and wherein the external actuator actuation includes electrically energizing the solenoid.

6. The method of claim 4, wherein the external actuator is a pneumatically-controlled device including a diaphragm or a piston, and wherein the external actuator actuation includes pneumatically energizing the diaphragm or piston.

7. The method of claim 4, wherein the first spring is an inner spring and the second spring is an outer spring or the first spring is an outer spring and the second spring is an inner spring.

8. The method of claim 4, wherein the first spring is a lower spring and wherein the second spring is an upper spring.

9. A method for a boosted engine comprising:
   during steady-state boosted engine operating conditions, holding a valve coupled in a recirculation path across a compressor at a semi-open position, the valve is coupled to a pair of opposing springs including a first, inner spring and a second, outer spring, and wherein holding the valve at the semi-open position includes passively holding the valve at the semi-open position via a first pre-compression of the first spring and a second, pre-compression of the second spring, without actuation of an external actuator coupled to the valve;
   in response to a tip-in, electrically controlling the external actuator to move the valve to a fully-closed position; and
   in response to a tip-out, electrically controlling the external actuator to move the valve to a fully-open position, wherein the engine is coupled to an on-road vehicle with wheels which contact a road surface, and wherein the tip-in is an operator pedal tip-in, and wherein the tip-out is an operator pedal tip-out and the steady-state boosted engine operating conditions include conditions where a compressor surge limit margin is below a threshold.

10. The method of claim 9, wherein electrically controlling the external actuator to move the valve to a fully-closed position includes actuating the external actuator in a first direction to increase compression of the first, inner spring while maintaining the pre-compression of the second, outer spring to move the valve to the fully-closed position, and wherein electrically controlling the external actuator to move the valve to a fully-open position includes actuating the external actuator in a second direction, opposite the first direction, to increase compression of the second, outer spring while maintaining the pre-compression of the first, inner spring to move the valve to the fully-open position.

11. The method of claim 10,
    wherein the external actuator is an electric solenoid, and wherein actuating the external actuator includes electrically energizing the solenoid, or
    wherein the external actuator is a piston or a diaphragm, and wherein actuating the external actuator includes pneumatically energizing the actuator.

12. A vehicle system, comprising:
    an engine;
    drive wheels coupling the vehicle to a road;
    a pedal for receiving an operator torque demand;
    a compressor for providing a boosted aircharge to the engine;
    a recirculation passage including a valve coupling an outlet of the compressor to an inlet of the compressor, the valve including a first, inner spring pre-compressed with a first load, and a second, outer spring pre-compressed with a second load, the valve coupled to an external actuator; and
    a controller with computer-readable instructions for:
        while a margin to a surge limit is higher than a threshold, operating the compressor with the valve maintained at a semi-open position without actuation of the external actuator; and
        in response to the margin being smaller than the threshold, reducing boost pressure by energizing the external actuator to shift the valve to a fully-open position.

13. The system of claim 12, wherein the controller includes further instructions for:
    in response to a pedal tip-in, increasing boost pressure by energizing the external actuator to shift the valve to a fully-closed position.

14. The system of claim 13, wherein the external actuator is a push/pull electric solenoid, and wherein energizing the external actuator includes electrically energizing the solenoid in a first direction to increase the first load on the first spring while maintaining the second load on the second spring to shift the valve to the fully-closed position and electrically energizing the solenoid in a second direction opposite the first direction to increase the second load on the second spring while maintaining the first load on the first spring to shift the valve to the fully-open position.

* * * * *